United States Patent
Ho et al.

(10) Patent No.: US 6,456,399 B1
(45) Date of Patent: Sep. 24, 2002

(54) BUFFER OVERFLOW AND UNDERFLOW CONTROL FOR FACSIMILE TRANSMISSION

(75) Inventors: Grant I. Ho, Germantown; Bangalore R. Bhaskar, North Potomac; Jack H. Rieser, Middleton, all of MD (US)

(73) Assignee: Telenor Satellite Services, Inc., Bethesda, MD (US)

( * ) Notice: Subject to any disclaimer, the term of this patent is extended or adjusted under 35 U.S.C. 154(b) by 0 days.

(21) Appl. No.: 09/030,232

(22) Filed: Feb. 25, 1998

(51) Int. Cl.[7] .............. H04N 1/00; H04N 1/40
(52) U.S. Cl. .............. 358/404; 358/444; 370/229; 375/220
(58) Field of Search .............. 358/404, 444, 358/442, 468, 405, 1.17, 1.5, 409; 370/229, 232, 231, 230; 375/220

(56) References Cited

U.S. PATENT DOCUMENTS

| | | | |
|---|---|---|---|
| 3,895,184 A | | 7/1975 | Komura et al. .......... 358/261.1 |
| 4,325,058 A | | 4/1982 | Wagner et al. .......... 340/562 |
| 4,586,088 A | * | 4/1986 | Kondo .......... 358/431 |
| 4,692,894 A | * | 9/1987 | Bemis .......... 364/900 |
| 4,703,477 A | | 10/1987 | Adelmann et al. .......... 358/412 |
| 4,733,308 A | | 3/1988 | Nakamura et al. .......... 370/474 |
| 4,920,534 A | | 4/1990 | Adelmann et al. .......... 370/474 |
| 5,185,863 A | * | 2/1993 | Hamstra et al. .......... 395/250 |
| 5,224,213 A | * | 6/1993 | Dieffenderfer et al. .......... 395/250 |
| 5,374,998 A | * | 12/1994 | Iida .......... 358/409 |
| 5,453,847 A | * | 9/1995 | Ngai .......... 358/451 |
| 5,521,719 A | * | 5/1996 | Yamada .......... 358/438 |
| 5,566,000 A | * | 10/1996 | Propach et al. .......... 358/412 |
| 5,621,720 A | * | 4/1997 | Bronte et al. .......... 370/241 |
| 5,978,868 A | * | 11/1999 | Maas .......... 710/52 |
| 6,125,139 A | * | 9/2000 | Hendrickson et al. .......... 375/220 |

FOREIGN PATENT DOCUMENTS

WO    WO 93/12608    6/1993

OTHER PUBLICATIONS

Spiros Dimolitsas et al, "Compression of Facsimile Graphics for Transmission Over Digital Mobile Satellite Circuits", 1991 IEEE, Milcom '91, pp. 30.1.1 through 30.1.4.
Abstract for Japanese Patent Application JP59183575 A dated Oct. 18, 1984.

* cited by examiner

*Primary Examiner*—Kimberly A. Williams
(74) *Attorney, Agent, or Firm*—Sughrue Mion, PLLC

(57) ABSTRACT

In a facsimile system, buffer underflow is prevented by forcing the transmit pointer to wait at a current end-of-line (EOL) symbol and transmit fill bits until there are at least two EOL symbols stored in the buffer. Buffer overflow is controlled by selectively dropping lines if the write pointer approaches too close to the transmit pointer and the difference between successive lines is sufficiently small (selective line-dropping), dropping lines whenever a permitted maximum buffer size is exceeded, and gradually changing the permitted distance between transmit and write pointers and permitted maximum buffer size as the image is scanned to accomplish a smooth buffer flushing.

26 Claims, 17 Drawing Sheets

CCITTの概要

沿革

CCITTは、国際電気通信連合（ITU）の四つの常設機関（事務総局、国際無線放送委員会、CCIR、CCITT）の一つとして、ITUの中でも、世界の国際通信上の諸問題を真先に取り上げ、その解決方法を見出して行く重要な機関である。日本名は、国際電信電話諮問委員会と称する。

CCITTの前身は、CCIF（国際電話諮問委員会）とCCIT（国際電信諮問委員会）である。CCIFは、1924年にヨーロッパに「国際長距離電話通信諮問委員会」が設置され、これが1925年のパリ電信電話会議のとき、正式に「国際電話諮問委員会」として設立されたものである。CCITは、同じく1925年の会議のとき、CCIFと併立するものとして設置された。

そして、CCITは、1956年12月に第18回総会が開催されたのち、併合されて現在のCCITTとなった。このCCITTが解散した直後、第1回総会を開催し、第2回総会は、1960年にニューデリーで、第3回総会は、1964年、ジュネーブで、第4回総会は1968年、アルゼンチンで開催された。

CCIFとCCITが合併したのは、有線電気通信の分野、とくに伝送路について電信回線と電話回線とを技術的に分ける意味がなくなってきたこと、各国とも大体において、電信部門と電話部門が同一組織内にあること、CCIFの事務局とCCITの事務局の合併による能率増進等がおもな理由であった。CCITTは、上述のように、ヨーロッパ内の国々によって、ヨーロッパ内の電信・電話の技術・運用・料金の基準を定め、あるいは統一をはかってきたので、現在でも、その影響を受け、会合参加国は、ヨーロッパの色彩を濃厚に帯びるに至った。この机世界的性格は第2次世界大戦後目ざましくなったアジア・アフリカ起する問題の研究が多い。たとえば、1960年のCCITT勧告の中で、抵触民地の独立に伴ってITUの構成員の中にこれらの国が加わり、ITUの中に新起する距離は2,500kmであったが、これはヨーロッパ内領域を想定したものである。

しかしながら、1956年9月に敷設された大西洋横断電話ケーブルは、大陸間電話通信の自動化および半自動化への技術的可能性を与え、CCITTがこの問題を取り上げるに及び、CCITTの性格は一変、机世界的色彩を実質的に帯びるに至った。この机世界的性格は第2次世界大戦後目ざましくなったアジア・アフリカ抵民地の独立に伴ってITUの構成員の中にこれらの国が加わり、ITUの中に新しい意見が導入されたことにも起因して、技術面、政治面の双方から導入されてきた。CCITTの机世界化は、1960年の第2回総会がニューデリーで開催されたことにもあらわれている。この総会までは、CCITT、CCIFのいずれにしろ、アメリカやアジアで総会が開催されたことがなく、CCITT委員長も、ニューデリー総会の挨拶文書で、この点には注目すべきであるとのべている。

任務

ITUは、全権委員会議、主管庁会議を始めとして、七つの機関をもち、それぞれの機関の権限と任務は国際電気通信条約に明記されている。そこで条約を参照してみるならば、CCITTの任務は、つぎのとおりとなっている。

「国際電信電話諮問委員会（CCITT）は、電信および電話に関する技術、運用および料金の問題について研究し、および意見を表明することを任務とする。」（1965年モントルー条約第187号）

「各国際諮問委員会は、その任務の遂行に当たって、新しい国または発展の途上にある国における地域的および国際的分野にわたる電気通信の創設、発達および改善に直接関連のある問題についても研究し、および意見を作成するように妥当な注意を払わなければならない。」（同第188号）

「各国際諮問委員会は、また、関係国の要請に基づき、その国内電気通信の問題について研究し、かつ、意見を行なうことができる。」（同第189号）

上記第187号と第188号にいわれる「勧告（Recommendation）」とは、フランス語のAvisから訳したもので、英語では「勧告」となっている。CCITTの表明する意見は、国際法的には拘束力をもたないものであって、この点が、条約、電信規則、電話規則等各国を拘束する力をもっているものと異なる。もっとも意見とは称しても、技術的分野では、電信規則、電話規則のこと、各国政府が承認してその内容を実施する強制規則ともならないので、実際にある機器の仕様を定める場合、多くの国の意見が統一されたこの「意見」に従わなければ、円滑な国際通信を行なうことができない場合が多い。この意見（または勧告）は、国際通信を行なう場合各国が直面する問題について、具体的意見を表明するもので、たとえば、大陸間ケーブルで大陸間通話を半自動化しようとする場合、その信号方式や取り扱う通話の種類および料金をどのようにするかを研究して意見を表明する。したがって、CCITTの活動は、つねに時代の最先端を行くもので、CCITTの活動方向は、そのまま世界の国際通信の活動方向の最先端であるともいえる。

CCITTの概要

沿革

CCITTは、国際電気通信連合（ITU）の四つの官設機関（事務総局、国際放送諮問委員会、CCIR、CCITT）の一つとして、ITUの中でも、世界の国際通信上の諸問題を真先に取り上げ、その解決方法を見出して行く重要な機関である。日本名は、国際電信電話諮問委員会と称する。

CCITTの前身は、CCIF（国際電話諮問委員会）とCCIT（国際長距離電信諮問委員会）である。CCIFは、1924年にヨーロッパに「国際長距離電話諮問委員会」が設置され、これが1925年のパリ電信電話会議のとき、正式に「国際電話諮問委員会」として万国電信連合の公式機関となったものである。CCITは、同じく1925年の会議のとき、CCIFと併立するものとして設置された。

そして、CCIFは、1956年12月に第18回総会が開催されたのち、併合されて現在のCCITTとなった。このCCITTが発足した直後、第1回総会が開催され、依って４回総会は、1960年にニューデリーで、第3回総会は、1964年、ジュネーブで、第4回総会は、1968年、アルゼンチンで開催された。

CCIFとCCITが合併したのは、有線電気通信の分野、とくに伝送路において電信回線と電話回線とを技術的に分ける意味がなくなってきたこと、各国とも大休において、電信部門と電話部門とが同一組織内にあることが、CCITTの事務局の合併による能率増進等がおもな理由であった。

CCITTは、上述のように、ヨーロッパ内の国ぐにによって、ヨーロッパ内の電信・電話の技術・運用・料金の基準を定め、あるいは統一をはかってきたので、現在でも、その影響を受け、会合参加国は、ヨーロッパの国が多く、ヨーロッパ中心に生起する問題の研究が多い。たとえば、1960年のCCITT勧告の中で、技術上起こする問題は約2,500にであったが、これはヨーロッパ内に起こする問題である。

しかしながら、1956年9月に敷設された大西洋横断電話ケーブルは、大陸間電話通信の自動化および半自動化への技術的可能性を与え、CCITTがこの問題を取り上げるに及び、CCITTの性格は漸次、世界的名彩を帯びるに至った。この世界的性格は第2次大戦後目ざましく急速に伸びるにつれ、アジア・アフリカ植民地の独立に伴ってITUの構成員の中にこれらの国が加わり、ITUの中に新しい意見が導入されたことにも起因して、技術面、政治面の双方から導入されている。

任務

ITUは、全権委員会議、主管庁会議を始めとして、七つの機関からの機関の職務と任務は国際電気通信条約的に明記されている。そこでCCITTの任務は、つぎのとおりとなっている。

「国際電信電話諮問委員会（CCITT）は、電信および電話に関する技術的、運用上および料金問題について研究し、および意見を表明することを任務とする。」（モントリオール条約第187号）

「各国際諮問委員会は、その任務の遂行に当たって、新しい国またはその直接関連のある地域のおよび国際的分野にわたる電気通信の発達に特に直接関連のある問題について研究し、および意見を作成するように払わなければならない。」（同第188号）

「名国際諮問委員会は、また、勧告を行うことができる。」（同第189号）

上記第187号と第188号にいわれる「意見」とは、フランス語では「Recommendation」となっている。訳したもので、英訳では「勧告（Recommendation）」となっている。「意見」（または勧告）は、国際通信に関連する具体的な意見を表明するもので、たとえば、大陸間国際電話について、具体的な仕様方式や取り扱いや料金の問題を表明する。従って、意見は、技術的にも強制力をもっていないものと異なる。実際にある徹底の仕様を定める場合、電信規則などを提案することもなるが、各国政府が承認する技術的分野では、電信規則を拘束する力をもっていないものであって、この意見は、また、電信規則以下その他の規則のごとく、数年ごとに改定される主管庁会議というような大会議の決定をまたなくても、関係される主管庁会議というような大会議の決定をまたなくても、関係国の同意さえ容易であるので、現在のように進歩の早い国際通信の取り扱い分野では非常に便利である。

CCITTの活動は、つねに時代の最先端を行くもので、まま世界の国際通信の括通方向であるともいえる。この意見は、また、電信規則以下その他の規則のごとく、CCITTの活動は、およびITTの活動は、どのようにするかを研究して意見を表明する。したがって、CCITTの活動は、国際通信の括通を半自動化しようとする場合、その信号方式や取り扱い方法は、四依国の意見を統一した国際的見解としては非常に便利である。

FIG. 3

| EOL SEQUENCE | MODE BIT | LINE-DROPPING BIT | MAXIMUM DIFFERENCES COMPRESSED DATA BITS |

L'ordre de lancement et de réalisation des applications fait l'objet de décisions au plus haut niveau de la Direction Générale des Télécommunications. Il n'est certes pas question de construire ce système intégré "en bloc" mais bien au contraire de procéder par étapes, par paliers successifs. Certaines applications, dont la rentabilité ne pourra être assurée, ne seront pas entreprises. Actuellement, sur trente applications qui ont pu être globalement définies, six en sont au stade de l'exploitation, six autres se sont vu donner la priorité pour leur réalisation.

Chaque application est confiée à un "chef de projet", responsable successivement de sa conception, de son analyse-programmation et de sa mise en oeuvre dans une région-pilote. La généralisation ultérieure de l'application réalisée dans cette région-pilote dépend des résultats obtenus et fait l'objet d'une décision de la Direction Générale. Néanmoins, le chef de projet doit dès le départ considérer que son activité a une vocation nationale donc refuser tout particularisme régional. Il est aidé d'une équipe d'analystes-programmeurs et entouré d'un "groupe de conception" chargé de rédiger le document de "définition des objectifs globaux" puis le "cahier des charges" de l'application, qui sont adressés pour avis à tous les services utilisateurs potentiels et aux chefs de projet des autres applications. Le groupe de conception comprend 6 à 10 personnes représentant les services les plus divers concernés par le projet, et comporte obligatoirement un bon analyste attaché à l'application.

II - L'IMPLANTATION GEOGRAPHIQUE D'UN RESEAU INFORMATIQUE PERFORMANT

L'organisation de l'entreprise française des télécommunications repose sur l'existence de 20 régions. Des calculateurs ont été implantés dans le passé au moins dans toutes les plus importantes. On trouve ainsi des machines Bull Gamma 30 à Lyon et Marseille, des GE 425 à Lille, Bordeaux, Toulouse et Montpellier, un GE 437 à Massy, enfin quelques machines Bull 300 TI à programmes câblés étaient récemment ou sont encore en service dans les régions de Nancy, Nantes, Limoges, Poitiers et Rouen ; ce parc est essentiellement utilisé pour la comptabilité téléphonique.

A l'avenir, si la plupart des fichiers nécessaires aux applications décrites plus haut peuvent être gérés en temps différé, un certain nombre d'entre eux devront nécessairement être accessibles, voire mis à jour en temps réel : parmi ces derniers le fichier commercial des abonnés, le fichier des renseignements, le fichier des circuits, le fichier technique des abonnés contiendront des quantités considérables d'informations.

Le volume total de caractères à gérer en phase finale sur un ordinateur ayant en charge quelques 500 000 abonnés a été estimé à un milliard de caractères au moins. Au moins le tiers des données seront concernées par des traitements en temps réel.

Aucun des calculateurs énumérés plus haut ne permettait d'envisager de tels traitements. L'intégration progressive de toutes les applications suppose la création d'un support commun pour toutes les informations, une véritable "Banque de données", répartie sur des moyens de traitement nationaux et régionaux, et qui devra rester alimentée, mise à jour en permanence, à partir de la base de l'entreprise, c'est-à-dire les chantiers, les magasins, les guichets des services d'abonnement, les services de personnel etc.

L'étude des différents fichiers à constituer a donc permis de définir les principales caractéristiques du réseau d'ordinateurs nouveaux à mettre en place pour aborder la réalisation du système informatif. L'obligation de faire appel à des ordinateurs de troisième génération, très puissants et dotés de volumineuses mémoires de masse, a conduit à en réduire substantiellement le nombre.

L'implantation de sept centres de calcul interrégionaux constituera un compromis entre : d'une part le désir de réduire le coût économique de l'ensemble, de faciliter la coordination des équipes d'informaticiens; et d'autre part le refus de créer des centres trop importants difficiles à gérer et à diriger, et posant des problèmes délicats de sécurité. Le regroupement des traitements relatifs à plusieurs régions sur chacun de ces sept centres permettra de leur donner une taille relativement homogène. Chaque centre "gèrera" environ un million d'abonnés à la fin du VIème Plan.

La mise en place de ces centres a débuté au début de l'année 1971 : un ordinateur IRIS 50 de la Compagnie Internationale pour l'Informatique a été installé à Toulouse en février ; la même machine vient d'être mise en service au centre de calcul interrégional de Bordeaux.

L'ordre de lancement et de réalisation des applications fait l'objet de décisions au plus haut niveau de la Direction Générale des Télécommunications. Il n'est certes pas question de construire ce système intégré "en bloc" mais bien au contraire de procéder par étapes, par paliers successifs. Certaines applications, dont la rentabilité ne pourra être assurée, ne seront pas entreprises. Actuellement, sur trente applications qui ont pu être globalement définies, six en sont au stade de l'exploitation, six autres se sont vu donner la priorité pour leur réalisation.

Chaque application est confiée à un "chef de projet", responsable successivement de sa conception, de son analyse-programmation et de sa mise en oeuvre dans une région-pilote. La généralisation ultérieure de l'application réalisée dans cette région-pilote dépend des résultats obtenus et fait l'objet d'une décision de la Direction Générale. Néanmoins, le chef de projet doit dès le départ considérer que son activité a une vocation nationale donc refuser tout particularisme régional. Il est aidé d'une équipe d'analystes-programmeurs et entouré d'un "groupe de conception" chargé de rédiger le document de "définition des objectifs globaux" puis le "cahier des charges" de l'application, qui sont adressés pour avis à tous les services utilisateurs potentiels et aux chefs de projet des autres applications. Le groupe de conception comprend 6 à 10 personnes représentant les services les plus divers concernés par le projet, et comporte obligatoirement un bon analyste attaché à l'application.

II - L'IMPLANTATION GEOGRAPHIQUE D'UN RESEAU INFORMATIQUE PERFORMANT

L'organisation de l'entreprise française des télécommunications repose sur l'existence de 20 régions. Des calculateurs ont été implantés dans le passé au moins dans toutes les plus importantes. On trouve ainsi des machines Bull Gamma 30 à Lyon et Marseille, des GE 425 à Lille, Bordeaux, Toulouse et Montpellier, un GE 437 à Massy, enfin quelques machines Bull 300 TI à programmes câblés étaient récemment ou sont encore en service dans les régions de Nancy, Nantes, Limoges, Poitiers et Rouen ; ce parc est essentiellement utilisé pour la comptabilité téléphonique.

A l'avenir, si la plupart des fichiers nécessaires aux applications décrites plus haut peuvent être gérés en temps différé, un certain nombre d'entre eux devront nécessairement être accessibles, voire mis à jour en temps réel : parmi ces derniers le fichier commercial des abonnés, le fichier des renseignements, le fichier des circuits, le fichier technique des abonnés contiendront des quantités considérables d'informations.

Le volume total de caractères à gérer en phase finale sur un ordinateur ayant en charge quelques 500 000 abonnés a été estimé à un milliard de caractères au moins. Au moins le tiers des données seront concernées par des traitements en temps réel.

Aucun des calculateurs énumérés plus haut ne permettait d'envisager de tels traitements. L'intégration progressive de toutes les applications suppose la création d'un support commun pour toutes les informations, une véritable "Banque de données", répartie sur des moyens de traitement nationaux et régionaux, et qui devra rester alimentée, mise à jour en permanence, à partir de la base de l'entreprise, c'est-à-dire les chantiers, les magasins, les guichets des services d'abonnement, les services de personnel etc.

L'étude des différents fichiers à constituer a donc permis de définir les principales caractéristiques du réseau d'ordinateurs nouveaux à mettre en place pour aborder la réalisation du système informatif. L'obligation de faire appel à des ordinateurs de troisième génération, très puissants et dotés de volumineuses mémoires de masse, a conduit à en réduire substantiellement le nombre.

L'implantation de sept centres de calcul interrégionaux constituera un compromis entre : d'une part le désir de réduire le coût économique de l'ensemble, de faciliter la coordination des équipes d'informaticiens; et d'autre part le refus de créer des centres trop importants difficiles à gérer et à diriger, et posant des problèmes délicats de sécurité. Le regroupement des traitements relatifs à plusieurs régions sur chacun de ces sept centres permettra de leur donner une taille relativement homogène. Chaque centre "gèrera" environ un million d'abonnés à la fin du VIème Plan.

La mise en place de ces centres a débuté au début de l'année 1071 : un ordinateur IRIS 50 de la Compagnie Internationale pour l'Informatique a été installé à Toulouse en février ; la même machine vient d'être mise en service au centre de calcul interrégional de Bordeaux.

FIG. 10B

VOICEBAND PROCESSING DEPARTMENT

The Voiceband Processing Department in COMSAT Laboratories' Communications Technology Division engages in research, development, and corporate support activities related to the transmission of voiceband signals over terrestrial and satellite networks. The department's activities have concentrated on several areas related to transmission over the public switched telephone network (PSTN), although increasing attention is now being devoted to issues related to interconnection of the PSTN with other networks, such as the integrated services digital network (ISDN).

Some of the areas which have been addressed over the past several years include echo control, voice coding, digital circuit multiplication technology, facsimile services, subjective speech evaluations, sound program audio coding, voice codec objective evaluations, and telecommunications standards.

Echo Control. COMSAT pioneered the development of the first network echo canceller, conducted the first international voice service demonstration (which included COMSAT's prototype equipment), reduced the technology to a form suitable for commercial implementation, and conducted numerous theoretical and practical studies on network echo control for corporate and external customers.

Voice Coding. Various technologies emphasizing the achievement of high-quality speech for telephony and mobile applications have been developed. Some specific areas addressed include the development of a 2.4-kbit/s linear predictive coder (LPC) for NASA's MSAT-X program, the implementation of various 32-kbit/s adaptive differential pulse code modulation (ADPCM) algorithms, and the development and implementation of several 16-kbit/s coding techniques, including a two-band/sub-band coder, a lattice ADPCM coder, an Adaptive Predictive Coder (APC) with noise feedback, and an APC with residual transform domain quantization. Also addressed are the coding of speech at 4.8-kbit/s using code excited LPC methods, and at 1.2-kbit/s using vector quantization and deconvolution techniques.

Digital Circuit Multiplication. In this area, several important systems of digital circuit multiplication equipment (DCME) equipment were developed for both corporate and external customers. These include a 64-kbit/s digital speech interpolation (DSI) system, a speech-interpolated delta modulation (SIDEL) system, a DSI prototype system for INTELSAT's 120-Mbit/s time division multiple access (TDMA) network, and, more recently, several prototype 32-kbit/s low-rate encoding LRE/DSI systems. The knowledge base acquired through these activities was instrumental in providing assistance to INTELSAT's 32-kbit/s LRE/DSI IESS-501 specification efforts and has been extensively used in developing non-intrusive terminal testers and performance monitors, as well as in conducting many theoretical and practical studies of various commercial terminals.

Facsimile. The voiceband processing department has conducted several studies addressing the transparency of facsimile signals through voiceband circuits that employ low-rate digital encoding, and is developing a facsimile interface under contract with INMARSAT. This interface converts group 3 fax signals to a digital baseband format and performs protocol conversions to permit real-time fax communications over digital mobile satellite circuits. In addition, a facsimile test-bed and high-resolution protocol analyzer were developed, as well as a subjective test methodology for quantifying the intelligibility of low-rate coded facsimile images subjected to a variety of coding and transmission channel degradations. Work is also being conducted in the area of facsimile compression using store and forward and real-time techniques.

Subjective Speech Evaluations. The Department has established a world-class subjective evaluation facility consisting of an acoustically isolated room, a computerized voice playback system, multiple vote collection stations, and a studio-quality audio processing/data interchange system. This facility has frequently been used to support international standardization efforts in voice encoding, an area in which COMSAT has long maintained a leadership role.

FIG. 11A

VICEBAND PROCESSING DEPARTMENT

The Voiceband Processing Department in COMSAT Laboratories' Communications Technology Division engages in research, development, and corporate support activities related to the transmission of voiceband signals over terrestrial and satellite networks. The department's activities have concentrated on several areas related to transmission over the public switched telephone network (PSTN), although increasing attention is now being devoted to issues related to interconnection of the PSTN with other networks, such as the integrated services digital network (ISDN).

Some of the areas which have been addressed over the past several years include echo control, voice coding, digital circuit multiplication technology, facsimile services, subjective speech evaluations, sound program audio coding, voice codec objective evaluations, and telecommunications standards.

Echo Control. COMSAT pioneered the development of the first network echo canceller, conducted the first international voice service demonstration (which included COMSAT's prototype equipment), reduced the technology to a form suitable for commercial implementation, and conducted numerous theoretical and practical studies on network echo control for corporate and external customers.

Voice Coding. Various technologies emphasizing the achievement of high-quality speech for telephony and mobile applications have been developed. Some specific areas addressed include the development of a 2.4-kbit/s linear predictive coder (LPC) for NASA's MSAT-X program, the implementation of various 32-kbit/s adaptive differential pulse code modulation (ADPCM) algorithms, and the development and implementation of several 16-kbit/s coding techniques, including a two-band/sub-band coder, a lattice ADPCM coder, an Adaptive Predictive Coder (APC) with noise feedback, and an APC with residual transform domain quantization. Also addressed are the coding of speech at 4.8-kbit/s using code excited LPC methods, and at 1.2-kbit/s using vector quantization and deconvolution techniques.

Digital Circuit Multiplication. In this area, several important systems of digital circuit multiplication equipment (DCME) equipment were developed for both corporate and external customers. These include a 64-kbit/s digital speech interpolation (DSI) system, a speech-interpolated delta modulation (SIDEL) system, a DSI prototype system for INTELSAT's 120-Mbit/s time division multiple access (TDMA) network, and, more recently, several prototype 32-kbit/s low-rate encoding LRE/DSI systems. The knowledge base acquired through these activities was instrumental in providing assistance to INTELSAT's 32-kbit/s LRE/DSI IESS-501 specification efforts and has been extensively used in developing non-intrusive terminal testers and performance monitors, as well as in conducting many theoretical and practical studies of various commercial terminals.

Facsimile. The voiceband processing department has conducted several studies addressing the transparency of facsimile signals through voiceband circuits that employ low-rate digital encoding, and is developing a facsimile interface under contract with INMARSAT. This interface converts group 3 fax signals to a digital baseband format and performs protocol conversions to permit real-time fax communications over digital mobile satellite circuits. In addition, a facsimile test-bed and high-resolution protocol analyzer were developed, as well as a subjective test methodology for quantifying the intelligibility of low-rate coded facsimile images subjected to a variety of coding and transmission channel degradations. Work is also being conducted in the area of facsimile compression using store and forward and real-time techniques.

Subjective Speech Evaluations. The Department has established a world-class subjective evaluation facility consisting of an acoustically isolated room, a computerized voice playback system, multiple vote collection stations, and a studio-quality audio processing/data interchange system. This facility has frequently been used to support international standardization efforts in voice encoding, an area in which COMSAT has long maintained a leadership role.

FIG. 11B

2.0 INTRODUCTION

This report describes work done in order to reduce the transmission requirements of facsimile images while maintaining high intelligibility in a mobile satellite communications network. The research performed here is a continuation of techniques previously developed by Dr. Spiros Dimolitsas and Frank Corcoran, both from COMSAT Laboratories. They developed two techniques to reduce the transmission requirements of facsimile images: *maximum differences* and *analysis-by-synthesis*. These techniques focuses on the implementation of a low-cost interface unit (FIU) suitable for facsimile communication between low-power mobile earth stations and fixed earth stations for both point-to-point and point-to-multipoint transmissions.

Both *maximum differences* and *analysis-by-synthesis* are cable of achieving a compression of approximately 32 to 1 when compared with original (uncoded image) and were designed to emphasize the intelligibility retention of hand-written images. These algorithms offer high reconstruction intelligibility and only little additional quality degradation when compared with standard resolution facsimile coding, which only offers compression ratios of the order of 12 to 1.

The basic idea behind the compression algorithms is the selective removal of pixel information from an intercepted document that is being transmitted using the CCITT Recommendation T.4 run-length coding (RLC). In this manner it is possible to non-linearly transform the probability density function (pdf) of the "run-lengths" by decreasing the width of the density peak (a critical characteristic of the "run-lengths" used to derive the T.4 RLC code). The narrowing of the pdf peak permits the re-optimization and development of more efficient variable length (Huffman) coding, thus resulting in reductions in transmission capacity requirements. Subsequently, the resulting image is encoded using variable-length coding (run-length coding) prior to transmission over the digital channel.

2.1 MAXIMUM DIFFERENCES

The *maximum differences* algorithm uses a scan line reduction process based upon the maximization of the content differences (on a byte-by-byte basis) of vertically adjacent bit-image scan-lines. This yielded a first stage 2-to-1 line compression along the vertical dimension. In addition, a second stage of vertical reduction was successfully concatenated with the first one. This second stage was designed to perform a bit-wise-OR operation between pairs of vertically adjacent lines (as derived from the first stage of vertical compression) thus reducing the overall number of lines requiring coding (after two compression stages) by a factor of 4-to-1 when compared to the uncoded bit-image.

This basic two-stage vertically compressing technique is subsequently complemented by a horizontal bit reduction algorithm to yield a total reduction of 16-to-1 in the number of bits of the resulting bit-map (as compared with the uncoded bit-image). Because the run-length codes used were not fully re-optimized, the 16-to-1 pixel-reduction only resulted in an additional 3-to-1 compression efficiency gain (over the T.30 coded facsimile image).

At the decoder, a reconstruction algorithm is employed which utilizes information in the neighborhood of the decoded pixels to fill-in (reconstruct) the missing lines, with as much fidelity to the original document as possible.

2.2 ANALYSIS-BY-SYNTHESIS

*Analysis-by-synthesis* is based upon the *maximum differences* method and employes the same basic decoding structure. However, at the encoder a recursive analysis-by-synthesis process is used with the objective of minimizing the resulting reconstruction error at the decoder.

FIG. 12A

2.0 INTRODUCTION

This report describes work done in order to reduce the transmission requirements of facsimile images while maintaining high intelligibility in a mobile satellite communications network. The research performed here is a continuation of techniques previously developed by Dr. Spiros Dimolitsas and Frank Corcoran, both from COMSAT Laboratories. They developed two techniques to reduce the transmission requirements of facsimile images: *maximum differences* and *analysis-by-synthesis*. These techniques focuses on the implementation of a low-cost interface unit (FIU) suitable for facsimile communication between low-power mobile earth stations and fixed earth stations for both point-to-point and point-to-multipoint transmissions.

Both *maximum differences* and *analysis-by-synthesis* are cable of achieving a compression of approximately 32 to 1 when compared with original (uncoded image) and were designed to emphasize the intelligibility retention of hand-written images. These algorithms offer high reconstruction intelligibility and only little additional quality degradation when compared with standard resolution facsimile coding, which only offers compression ratios of the order of 12 to 1.

The basic idea behind the compression algorithms is the selective removal of pixel information from an intercepted document that is being transmitted using the CCITT Recommendation T.4 run-length coding (RLC). In this manner it is possible to non-linearly transform the probability density function (pdf) of the "run-lengths" by decreasing the width of the density peak (a critical characteristic of the "run-lengths" used to derive the T.4 RLC code). The narrowing of the pdf peak permits the re-optimization and development of more efficient variable length (Huffman) coding, thus resulting in reductions in transmission capacity requirements. Subsequently, the resulting image is encoded using variable-length coding (run-length coding) prior to transmission over the digital channel.

2.1 MAXIMUM DIFFERENCES

The *maximum differences* algorithm uses a scan line reduction process based upon the maximization of the content differences (on a byte-by-byte basis) of vertically adjacent bit image scan-lines. This yielded a first stage 2-to-1 line compression along the vertical dimension. In addition, a second stage of vertical reduction was successfully concatenated with the first one. This second stage was designed to perform a bit-wise-OR operation between pairs of vertically adjacent lines (as derived from the first stage of vertical compression) thus reducing the overall number of lines requiring coding (after two compression stages) by a factor of 4-to-1 when compared to the uncoded bit-image.

This basic two-stage vertically compressing technique is subsequently complemented by a horizontal bit reduction algorithm to yield a total reduction of 16-to-1 in the number of bits of the resulting bit-map (as compared with the uncoded bit image). Because the run-length codes used were not fully re-optimized, the 16-to-1 pixel-reduction only resulted in an additional 3-to-1 compression efficiency gain (over the T.30 coded facsimile image).

At the decoder, a reconstruction algorithm is employed which utilizes information in the neighborhood of the decoded pixels to fill-in (reconstruct) the missing lines, with as much fidelity to the original document as possible.

2.2 ANALYSIS-BY-SYNTHESIS

*Analysis-by-synthesis* is based upon the *maximum differences* method and employes the same basic decoding structure. However, at the encoder a recursive analysis-by-synthesis process is used with the objective of minimizing the resulting reconstruction error at the decoder.

FIG. 12B

This document is being generated so that it can be used as a facsimile test chart of handwritten english characters (text).

The application relevant to this chart, encompasses the transmission of group 3 fax in a store-and-forward mode over low-rate digital satellite links (i.e., less than 2400 bit/s). The application in mind is group 3 over Inmarsat's Standard-C service.

Group 3 facsimile deals with the transmission of documents over the analog public switched telephone network, or PSTN, as it is usually referred to. Group 3 facsimile recommendations can be found in relevant international standards recommendations, notably the CCITT Recommendation T.30 (Protocols), T.4 (Coding), V.21 (modulation schemes for low-speed procedural signals), V.27ter and V.29 (modulation schemes for the higher speed message signals).

With regard to the transmission speeds employed, these are 2400, 4800, 7200 and 9600 bit/s for the high speed message signals; and 300 bit/s (also optionally 2400 bit/s) for the low-rate handshaking (or procedural signals).

FIG. 13A

This document is being generated so that it can be used as a facsimile test chart of handwritten english characters (text).

The application relevant to this chart, encompasses the transmission of group 3 fax in a store-and-forward mode over low-rate digital satellite links (i.e., less than 2400 bit/s). The application in mind is group 3 over Inmarsat's Standard-C service.

Group 3 facsimile deals with the transmission of documents over the analog public switched telephone network, or PSTN, as it is usually referred to. Group 3 facsimile recommendations can be found in relevant international standards recommendations, notably the CCITT Recommendation T.30 (Protocols), T.4 (Coding), V.21 (modulation schemes for low-speed procedural signals), V.27ter and V.29 (modulation schemes for the higher speed message signals).

With regard to the transmission speeds employed, there are 2400, 4800, 7200 and 9600 bit/s for the high speed message signals; and 300 bit/s (also optionally 2400 bit/s) for the low-rate handshaking (or procedural signals).

FIG. 13B

BUFFER OVERFLOW AND UNDERFLOW CONTROL FOR FACSIMILE TRANSMISSION

BACKGROUND OF THE INVENTION

1. Field of the Invention

The invention relates generally to facsimiles, and, more particularly, to controlling buffer overflow and underflow for facsimile transmission over mobile communication channels by using fill bits, selective line-dropping, drastic line-dropping, and smooth buffer-flushing.

2. Description of the Related Art

It is known that facsimile transmission time can be reduced by using compression techniques before transmission of facsimile documents scanned into a sending facsimile machine. The compressed facsimile documents are stored in a buffer before being transmitted via a communication network to a receiving facsimile machine. Image compression techniques are particularly important in facsimile transmission in mobile communications because of the relatively high cost for air time. Further, in mobile communication networks it is known to use a circular buffer to store the digitized and compressed facsimile document before transmission. However, the circular buffer can experience buffer overflow or underflow problems which degrade the accuracy of the facsimile document as reproduced by the receiving facsimile machine.

To transmit standard Group 3 facsimile (fax) documents over mobile communications networks in a cost-efficient manner, it is necessary to employ secondary image compression techniques to reduce the amount of information necessary to describe the image. When secondary image compression is employed for a standard G3 fax machine, it is essential to implement a method of buffer control to control the flow of data bits between the compression algorithm and the mobile channel. Controlling the flow of data is required since image compression gains can vary significantly from image scan line to scan line which will not necessarily be coincident to the transmission channel transmission rate. For instance, if there is a high degree of correlation between a current scan line and its previous scan line, then the compression gain for the current scan line will be much higher than if there were a low degree of similarity between adjacent scan lines. As a result, statistical variations in these compression gains lead to fluctuations in the rate at which encoded bits of information become available for transmission. Since the transmission channel requires a steady flow of bits at a constant rate, a buffering mechanism is required to interface the compression algorithm and the communications channel. However, the buffer can suffer from buffer underflow and buffer overflow which creates illegible and/or incomplete documents to be transmitted to the receiving fax machine.

Buffer underflow results when, over a period of time, the compression process generates data bits at a slower rate than can be transmitted over the channel. Buffer underflow must be suitably controlled to maintain proper operation and transmission of the fax document or the fax document will not be legible as printed by the receiving tax machine. Buffer overflow results when, over a period of time, the compression algorithm generates bits at a higher rate than can be transmitted over the channel. If not controlled, buffer overflow can lead to a loss of data and a disruption in the transmission of the image, each contributing to an illegible and/or incomplete document as printed by the receiving fax machine. Buffer overflow is controlled by generating, just before the buffer capacity is exceeded, a control signal which causes the facsimile system to delete the preceding scan line.

Further, traditional facsimile compression techniques suffer from a problem of clipping the bottom of highly detailed documents because there is a maximum period of 1.6 seconds available for emptying the buffer at the end of each transmitted document page. Any untransmitted data that remains in the buffer after the 1.6 seconds available for emptying the buffer is deleted from the buffer and not transmitted, allowing the buffer to begin loading data for the next transmission page. The more highly detailed the transmission document, the more data that will be deleted from the end of the transmission document page, and the more clipping of the printed document that occurs at the receiving facsimile machine. This problem occurs in traditional facsimile compression techniques when sending highly detailed documents regardless of the facsimile machine's ability to control the buffer to prevent underflow or overflow during transmission.

SUMMARY OF THE INVENTION

In view of the above, one object of the present invention is to provide an improved facsimile system.

Another object of the invention is to provide a facsimile system which enables the use of secondary compression techniques for efficient transmission of facsimile documents over mobile networks without significant buffer underflow or buffer overflow.

Another object of the present invention is to provide a facsimile system which can transmit complex documents without losing data as a result of the bottom of a page being clipped.

Another object of the present invention is to provide a facsimile system which can transmit complex documents with a minimal amount of information loss confined to only extremely detailed documents, while still maintaining high overall image intelligibility.

Another object of the present invention is to provide a process for facsimile transmission which improves facsimile document transmission accuracy by controlling a buffer mechanism to prevent data underflow and/or overflow.

According to one aspect of the present invention, buffer underflow is prevented by forcing the buffer's transmit pointer to wait at the previous end-of-line (EOL) symbol, e.g., a bit sequence consisting of 11 0's followed by a 1 (i.e., 000000000001), until at least one subsequent EOL symbol is present in the buffer. While the transmit pointer waits at the most recent EOL symbol, the channel is then stuffed with fill bits, bits with value 0. This technique is simple to implement, causes no loss in the performance of the compression algorithm, and cures the problem of underflow which causes loss of synchronization and distortion of the facsimile document.

According to another aspect of the present invention, buffer overflow and page cutoff is prevented using the buffer control mechanisms of selective line-dropping, drastic line-dropping, and smooth buffer-flushing processes to control the flow of data information in the transmission of facsimile documents across mobile networks. The present invention uses selective line-dropping to solve the buffer overflow problem and drastic line-dropping and smooth buffer-flushing processes to solve the page cutoff problem.

For selective line-dropping, a 20,000 bit circular buffer is provided with various zones to indicate distinct regions of bit locations within which the buffer's write pointer can be relative to the buffer's transmit pointer in the circular buffer. The transmit pointer reads bits but of the circular buffer to be sent across the channel; the write pointer writes bits into the circular buffer after the compression algorithm. In a preferred embodiment, there are five distinct zones designated in the circular buffer which include the safety zone, low critical zone, middle critical zone, high critical zone, and cutoff zone, each zone respectively corresponding to the write pointer getting closer to the transmit pointer and thereby increasing the probability of buffer overflow (i.e., write pointer overcoming the transmit pointer). If the write pointer is located anywhere within the safety zone, no overflow control is necessary. If the write pointer falls within any one of the three critical zones (low, middle or high), buffer overflow algorithms are initiated. First, the current scan line and previous scan line are compared with one another to determine their bit difference value, and this value is compared with a threshold associated with the particular critical zone, with the critical zones having higher thresholds as the transmit pointer is approached more closely by the write pointer. If the difference value between the two scan lines does not exceed the threshold, for that critical zone, then the current scan line and previous scan lines are considered similar enough for line-dropping to take place. Otherwise, no line-dropping occurs and the present scan line is simply encoded.

If a scan line is determined to be dropped, a special line-dropping bit is set to 1 and sent to the decoder. At the receiving facsimile system, the line-dropping mode is detected by monitoring the code bit and the previously decoded scan line is duplicated at the current scan line's position in the output document.

When a highly detailed document is scanned, compression gains are extremely low, the probability of buffer overflow is extremely high, and the write pointer may actually fall within the cutoff zone. Should this situation arise, an end of page (EOP) sequence, consisting of 6 EOL sequences, is immediately transmitted to the receiving facsimile machine. This signals the end of document transmission and the termination of any further decoding. The remainder of the document, from the point of cutoff, is then replaced with blank lines, ensuring that the resulting document at the receiving facsimile machine is not filled with garbage, but rather, implicating to the person receiving the fax, that an error has occurred during the transmission process.

To eliminate the page cutoff problem, smooth buffer-flushing is initiated at the start of document processing, where after a certain percentage of the incoming image has been scanned, the maximum number of bits allowed to exist in the buffer is reduced. This is performed in a stair-step manner such that the maximum number of bits allowed in the buffer is reduced as the percentage of the present page scanned increases.

Within each percentage region of a page, selective line-dropping is customized for that specific maximum buffer capacity. Hence, as the permitted maximum buffer capacity gradually decreases over the course of a document, the sizes of the safety zone and three critical zones increase, thereby increasing the probability of selective line-dropping and reducing the probability of buffer overflow. Within each of the percentage regions, drastic line-dropping is initiated if the number of bits between the write pointer and transmit pointer exceeds the maximum number of bits allowed to exist in the buffer for that region. Drastic line-dropping is the same as selective line-dropping except that all scan line bits written into the circular buffer are consecutively dropped until the distance between the write and transmit pointers is less than the maximum buffer threshold.

BRIEF DESCRIPTION OF THE DRAWINGS

The above and other objects, features, and advantages of the present invention will become more apparent from the following description of one preferred embodiment thereof taken in conjunction with the accompanying drawings, wherein:

FIG. 2 illustrates a CCITT highly detailed document used to test the performance of the present invention.

FIG. 3 illustrates a CCITT highly detailed document which has been clipped at the end of the page due to the use of traditional facsimile compression techniques on a standard G3 facsimile machine.

FIG. 4 is a diagram illustrating the data format for one scan line in accordance with the present invention.

FIG. 8 illustrates a CCITT highly detailed document simulated with the rough buffer-flushing process of the present invention.

FIG. 9 illustrates a CCITT highly detailed document simulated with the smooth buffer-flushing process of the present invention.

FIG. 10A is an original test document as scanned into the facsimile machine, used to illustrate the improved facsimile document accuracy and legibility of the present invention.

FIG. 10B is the processed test document of FIG. 10A and illustrates the simulation of the buffer control processes of the present invention.

FIG. 11A is an original test document as scanned into the facsimile machine, used to illustrate the improved facsimile document accuracy and legibility of the present invention.

FIG. 11B is the processed test document of FIG. 11A and illustrates the simulation of the buffer control processes of the present invention.

FIG. 12A is an original test document as scanned into the facsimile machine, used to illustrate the improved facsimile document accuracy and legibility of the present invention.

FIG. 12B is the processed test document of FIG. 12A and illustrates the simulation of the buffer control processes of the present invention.

FIG. 13A is an original test document as scanned into the facsimile machine, used to illustrate the improved facsimile document accuracy and legibility of the present invention.

FIG. 13B is the processed test document of FIG. 13A and illustrates the simulation of the buffer control processes of the present invention.

DESCRIPTION OF THE PREFERRED EMBODIMENT

Figure 1:
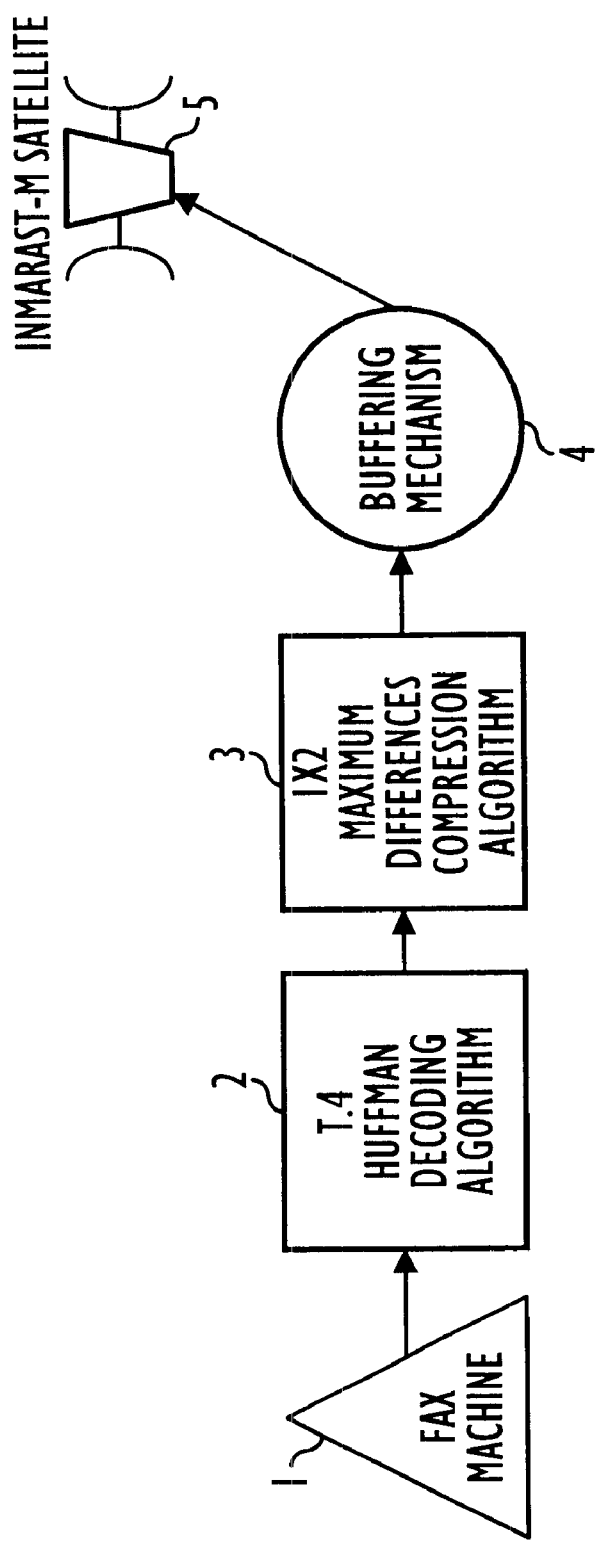
FIG. 1 is a diagram showing the land earth facsimile station in accordance with the present invention.

Referring to FIG. 1, the present invention comprises a standard G3 fax machine 1 and a secondary image compression technique in which the fax image is first decoded by the T.4 Huffman algorithm 2 and then compressed using a secondary compression algorithm 3. The T.4 Huffman algorithm is that shown in CCITT Recommendation T.4, *"Standardization of Group 3 Facsimile Apparatus for Document Transmission"*, Red Book, Vol. VII, Facsimile VII.3, Malaga-Torremolinos 1984, pp. 16-3 1.

A 1×2 Maximum Differences compression algorithm 3 is used for the compression process. The 1×2 Maximum Difference compression algorithm of the present invention is that shown in *"Compression of Facsimile Graphics for Transmission over Digital Mobile Satellite Circuits"*, Spiros Dimolitsas and Frank corcoran, IEEE Military Communications Conference, MILCOM 91, Washington D.C., Nov. 4–8, 1991. However, the present invention is equally applicable with other image compression algorithms that are capable of compressing binary images.

After secondary image compression 3 has been completed, the resulting bits of information are sent to an output buffer 4 where they await channeling to the satellite receiver 5. Such buffers are typically implemented as DSP circular buffers so that their finite storage space may be continually reused. This finite storage capacity also represents a limit on the maximum number of bits that can be stored in the buffer, before buffer overflow occurs.

The rate at which bits of information are written into the circular buffer, via the write pointer (wp), is dependent upon the amount of information stored in the incoming scan line since different scan lines contain different amounts of information. As a result, bits are written into the buffer as bursts of information rather than at a constant rate. However, the rate at which these bits of information are read from the buffer (for transmission over the satellite channel), via the transmit pointer (tp), is constant. For example, the transmission rate is 3,200 bps for the Inmarsat-M satellite system.

For highly detailed documents, where compression gains are significantly lower compared to less detailed documents, the rate at which the write pointer writes into the circular buffer 4 is often greater than the rate at which the transmit pointer reads. Thus, the problem of buffer overflow occurs when the write pointer has the opportunity to overtake the position of the transmit pointer before the transmit pointer has had a chance to read what was written into the buffer 4. The results are often catastrophic as the facsimile document at the receiving Mobile Earth Station (in the case of the Inmarsat-M system) becomes heavily distorted, or completely untransmitted from the point of overflow. The selective line-dropping process of the present invention was developed to address this problem and incorporates a special code bit, known as the line-dropping bit. This process triggers various line-dropping routines to increase the relative distance between the two pointers, thereby keeping the write pointer at a "safe" distance behind the transmit pointer and eliminating any possibility of buffer overflow.

In developing a complete solution to buffer overflow the additional problem of page clipping is also addressed. Due to reception of the T.30 end-of-page (EOP) confirmation message of a document transmission, there exists a maximum period of 1.6 seconds available for emptying the buffer 4, i.e., buffer-flushing, at the end of each page for the document being transmitted. Since the transmit pointer reads at a constant rate of 3,200 bps for the facsimile machine of the preferred embodiment, it can be calculated that no more than 5,000 bits of information (approximately 3,200 bps×1.6 seconds) can remain in the buffer 4 and be accurately transmitted at the end of document transmission. If there are more than 5,000 bits of information, buffer-flushing cannot be completed and the resulting document will become "clipped" or devoid of information towards the bottom of the page equivalent to the number of leftover bits in the buffer.

For highly detailed documents such as CCITT test document 7 illustrated in FIG. 2, this is a severe problem since approximately 30,000 bits remain in the buffer 4 at the end of document transmission if no methods of buffer control are exercised. When a maximum of 5000 bits in the buffer is finally flushed after document transmission, this results in the loss of about 25,000 bits of information and approximately 15% of the document is clipped as illustrated in FIG. 3. The present invention overcomes this clipping problem by using drastic line-dropping and smooth buffer-flushing algorithms to gradually reduce the number of bits in the buffer to a maximum of 5,000 bits. This ensures that the buffer can be fully flushed at the end of document transmission with only a minimal loss of information for the overall document.

The processes of the present invention have been rigorously tested on over seventy-five facsimile documents, including the 8 standard CCITT test documents, to yield optimal performance. Although employing the buffer control techniques as shown in the present invention will result in some overall document degradation, the amount of distortion is limited only to highly detailed documents and result in minimal loss of intelligibility. By employing such processes, the immediate advantages include the following: 1) feasibility of employing secondary compression techniques for efficient transmission of fax over mobile networks, 2) transmission of complex documents without bottom-of-page clipping, and 3) minimal amount of information loss confined to only extremely detailed documents while still maintaining high overall image intelligibility. Finally, as will be clear to one skilled in the art, the present invention is flexible and applicable to a wide variety of other systems such as Inmarsat Mini-M, North American digital cellular systems, European GSM, and AFRTS.

As previously mentioned, the standard G3 fax image is decoded into image scan lines using T.4 Huffman decoding 2, which are, in turn, compressed by the secondary compression technique such as the 1×2 Maximum Differences compression algorithm 3. The resulting bits of information are then stored in a circular buffer 4, awaiting transmission across the satellite channel 5. The boundary between successive scan lines is marked by an end-of-line (EOL) symbol, which is a binary sequence of 11 zeros and a single one (000000000001). The EOL symbol is immediately followed by two special code bits. The first bit is a mode bit which indicates to the decoder whether the current scan line was encoded in a 1-dimensional mode or a 2-dimensional mode. The second bit is a line dropping bit which indicates if the current scan line bits were "dropped" or left untransmitted to the decoder. The capability of dropping a scan line and indicating this action to the decoder is a key component of the buffer overflow control mechanism. A detailed description of the buffer underflow control and buffer overflow control processes of the present invention follows.

Figure 5:
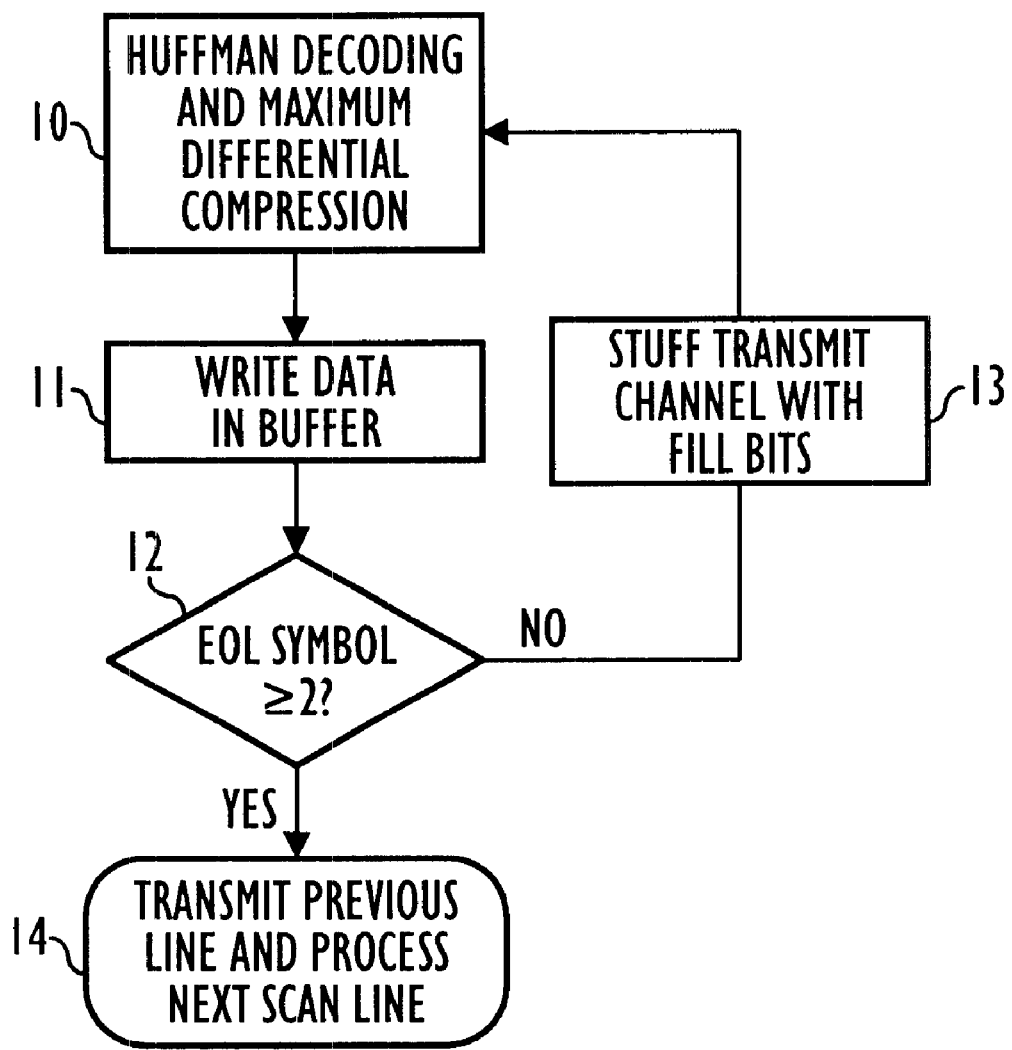
FIG. 5 is a flow chart illustrating the control buffer underflow process in accordance with the present invention.

The buffer underflow control process will now be described with reference to FIGS. 4 and 5. Buffer underflow is prevented by ensuring that the write pointer (wp) is always ahead of the transmit pointer (tp). At the beginning of the current page to be processed, the write and transmit pointers are each at the $0^{th}$ memory location in the circular buffer. Each scan line is then encoded as shown in FIG. 4. As each scan line is compressed, the corresponding bits of information are written into the buffer, thereby advancing the write pointer. FIG. 5 illustrates the process steps of decoding and compression as a single step 10. Normally, the transmit pointer also advances at a constant rate (3,200 bps for Inmarsat-M).

FIG. 5 illustrates the additional steps in the buffer underflow control process which are as follows. First, in step 11 the present scan line data is written into the buffer 4 and the write pointer advances. When the transmit pointer reaches an EOL symbol, step 12 is entered and the transmit pointer is only allowed to advance further if there is at least one more EOL symbol in the buffer between the transmit and the write pointers. If this condition is not satisfied, the transmit pointer is forced to wait at the current EOL symbol until the next EOL is written into the buffer after repeating steps 0 and 11. During the waiting period when the transmit pointer is fixed at the current EOL, at step 13, the transmission channel is stuffed with fill bits which are bits of binary value 0. The decoder understands that any sequence of zero valued bits arriving after complete decoding of a scan line and just preceding an EOL symbol are fill bits, and can consequently discard these bits. On the other hand, if at step 12 there are 2 or more EOL symbols detected, the transmit pointer is allowed to proceed normally by transmitting previously decoded and compressed line data while the next line is scanned, decoded, and compressed as shown in step 14.

Note that an advantage of sending fill bits before the EOL symbol is that these bits can be easily recognized and are stripped at the decoder. On the other hand, if fill bits were instead inserted at arbitrary positions within the scan line, rather than at EOL symbols, it would become necessary to dedicate bit patterns for the transmission of the "fill" information. Since such patterns cannot be employed in the encoding operation, this would significantly reduce the efficiency of the encoding algorithm.

Figure 6:
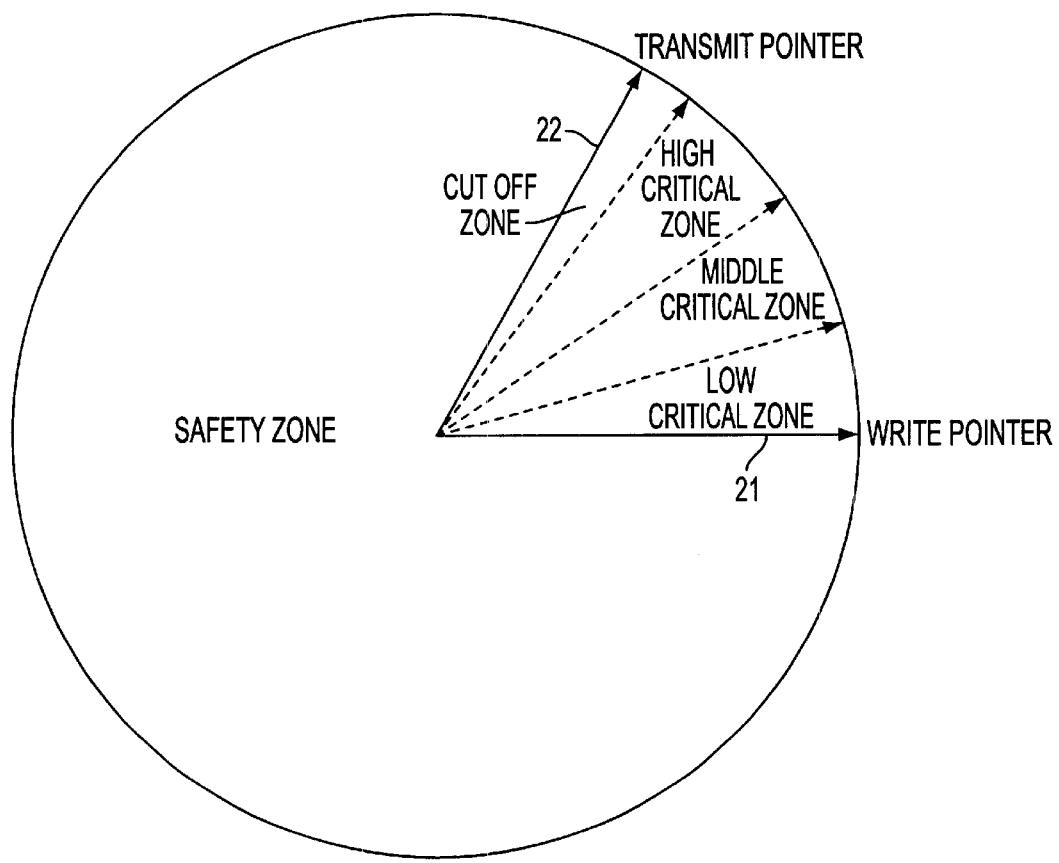
FIG. 6 is a diagram showing the various zones ot the circular buffer in accordance with the present invention.

The buffer overflow control process will now be described with reference to FIGS. 6 and 7. The buffer overflow mechanism of the present invention consists of a 20,000 bit circular buffer 4 within which various zones are set for which the write pointer 21 can come to within the transmit pointer 22. According to FIG. 6, there are five distinct regions in the circular buffer. The safety zone limits the write pointer 21 to within anywhere between 20,000 bits to 3,000 bits counter-clockwise, behind the transmit pointer 22. If the write pointer 21 is located anywhere within this region, it is considered a "safe" data bit distance behind the transmit pointer 22 such that no overflow control is necessary. The reason this region is considered safe is since every scan line contains a maximum number of 1728 pels (picture elements), when the next scan line is encoded and compressed, there is no possible way for the write pointer 21 to overtake the transmit pointer 22 if there is at least a 3,000 bit difference between the two pointers.

If the write pointer 21 is between 2,999 bits to 2,000 bits behind the transmit pointer, the write pointer 21 is said to reside in the low critical zone; between 1,999 bits to 1,000 behind the transmit pointer 22 represents the middle critical zone; between 999 to 85 bits behind the transmit pointer 22 represents the high critical zone, and between 84 bits and 0 bits behind the transmit pointer 22 represents the cutoff zone.

Figure 7:
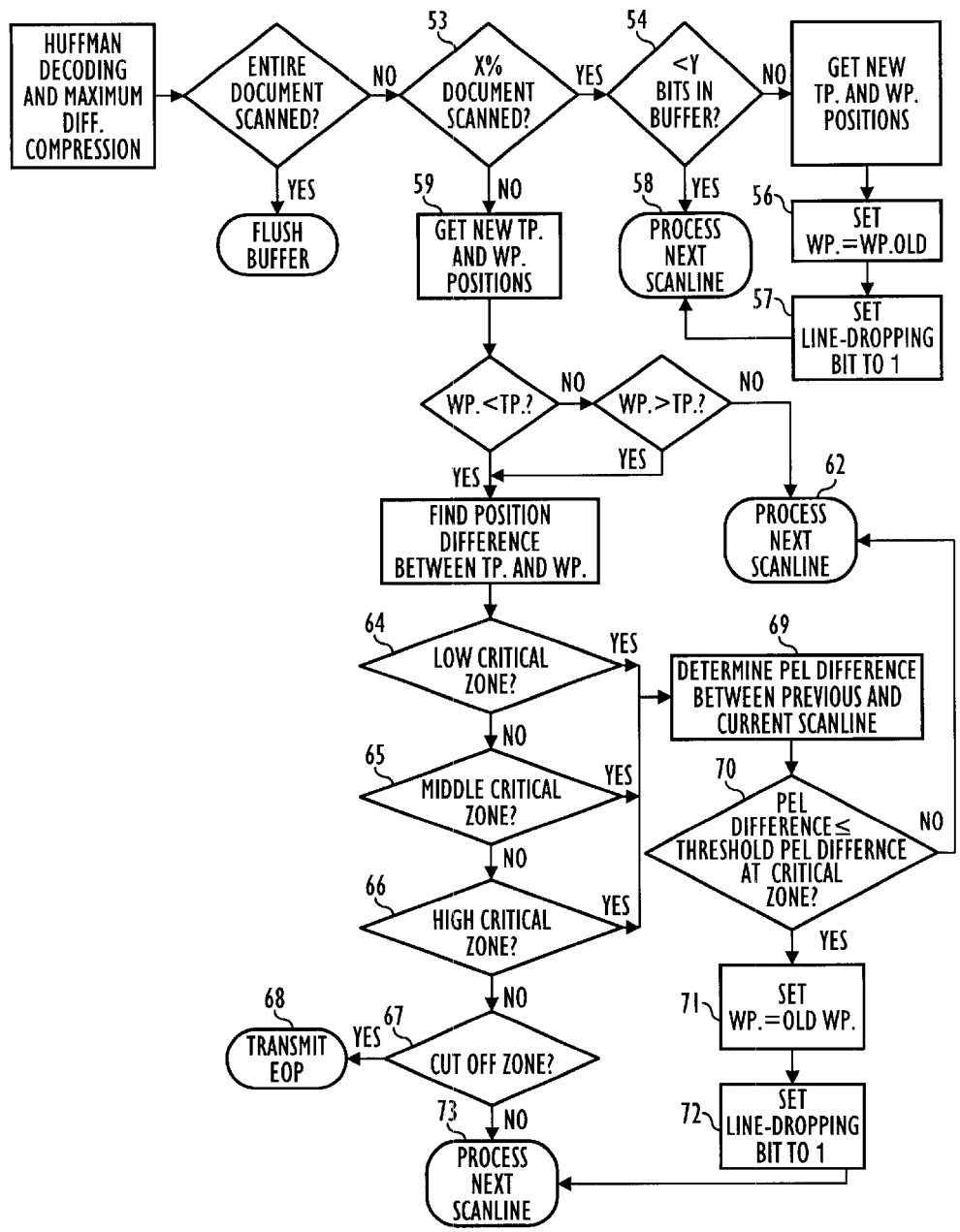
FIG. 7 is a flow chart illustrating the control buffer overflow process in accordance with the present invention.

Referring to FIG. 7, the process steps for the selective line dropping algorithm include steps 62–73 and will hereinafter be described. If the write pointer 21 falls within any one of the three critical zones, buffer overflow algorithms are initiated by step 64 for the low critical zone, step 65 for the middle critical zone, and step 66 for the high critical zone. Then, in step 69, the current scan line and previous scan line are compared with one another to determine the pel (picture element) percentage difference, or amount of non-correlation, between the two scan lines. The pel percentage difference is defined as, $$\text{pel percentage difference} = \frac{\text{\# of pels different between previous and current scan line}}{\text{total \# of pels}}$$

Next, in step 70, the pel percentage difference is compared to the pel percentage threshold specified for that critical zone.

In the low critical zone, the pel threshold is set at, for example, 15%; in the middle critical zone, the pel percentage threshold is set at, for example 20%, and in the high critical zone the pel percentage threshold is set at, for example, 25%. If the pel percentage difference between the two scan lines is less than or equal to the pel percentage threshold specified for that critical zone, then the current scan line and previous scan lines are considered similar enough for line-dropping to take place as shown in steps 71 and 72. For instance, assume that after the $k^{th}$ scan line has been encoded and compressed, the write pointer 21 and transmit pointer 22 adjust themselves so that the final position of the write pointer 21 is 1,500 bits counter-clockwise behind the transmit pointer 22, in the middle critical zone. If the pel percentage difference between the $k^{th}$ scan line and the $(k-1)^{th}$ scan line is less than or equal to 20%, line-dropping takes place in steps 71 and 72, followed by encoding of the $(k+1)^{th}$ scan line in step 73. Otherwise, no line-dropping occurs; both the $k^{th}$ and $(k+1)^{th}$ scan lines are simply encoded.

When line-dropping occurs in one of the three critical zones, the transmit pointer 22 advances normally at 3,200 bps while the current position of the write pointer 21 is brought back to its previous position in the buffer as shown in step 71. As a result, the information bits of the current scan line are not transmitted to the decoder. Although this strategy results in a small loss of information equivalent to the number of bits in the dropped scan line, the advantages from line-dropping are an increase in the distance between the two pointers and thus, the elimination of any buffer overflow.

After a scan line has been dropped, a specific 14-bit sequence consisting of a 12-bit end-of-line (EOL) sequence, 000000000001, followed by the mode bit, and followed by the line-dropping bit set to 1, are sent to the decoder as indicated by step 72. The line-dropping bit is a special code bit reserved for indicating line-dropping mode to the decoder. The bit is normally reset to 0 and transmitted immediately after. the EOL sequence as part of each encoded line. At the receiving facsimile system, the line-dropping mode is detected by monitoring the code bit. When the decoder of the receiving facsimile system reads the line-dropping bit as 1, line-dropping has occurred and the previously decoded scan line is duplicated at the current scan line's position in the output document. If the line-dropping bit is set to 0 (default), signifying that no line-dropping has occurred, the current scan line is simply reconstructed in the resulting image.

In some highly detailed documents where compression gains are extremely low, the write pointer 21 may actually fall within the cutoff zone as shown in step 67. Should this situation arise, an EOP sequence (6 EOL sequences) is immediately transmitted across the satellite receiver 5 as shown in step 68. This also signals the end of document transmission and the termination of any further decoding. The remainder of the document, from the point of cutoff, is then inserted with blank lines, ensuring that the resulting document at the receiving facsimile machine is not filled with garbage, but rather, implicating to the person receiving the fax transmission that an error has occurred during the transmission process.

It should be noted that such an event seldom, if ever, occurs since the current Huffman encoding 2 and Maximum Differences compression techniques 3 yield sufficient enough compression gains which when combined with the buffer control algorithms, very rarely allow for the write pointer 21 to enter the cutoff zone. For the seventy-five sample documents tested with the present invention, including the extremely detailed CCITT test document 7, none of the images were clipped due to cutoff.

Selectively dropping a scan line within each specific critical zone has two major advantages. First, although line-dropping and duplicating the previously decoded line result in a small loss of information, the positive trade-off is that only a slight amount of distortion is generated as opposed to clipping the entire document from the point of overflow if no forms of overflow control were exercised. The second advantage of selective line-dropping is that it allows for more evenly distributed distortions across the entire image instead of highly clustered distortions in one central region. This increases the document's overall intelligibility and attractiveness.

FIG. 7 also illustrates the drastic line-dropping process and smooth buffer-flushing process as shown in steps 51–61 and hereinafter described. The drastic line-dropping algorithm is used in conjunction with the smooth buffer-flushing algorithm to reduce the number of bits in the buffer to 5,000 bits at the end of document transmission. This ensures that complete buffer-flushing can occur within the timing constraint of 1.6 seconds between pages for the facsimile system of the preferred embodiment. Smooth buffer-flushing at step 53 is initiated at the start of document processing, where after a certain percentage X of the incoming page image has been scanned, the maximum number of bits allowed to exist in the buffer 4 is reduced. Table 1 below displays the maximum buffer sizes, Y, allowed for various ranges of scanned document, identified as percentage X. Note that a test document is representative of one page of a standard facsimile document.

TABLE 1

| Percentage X of Document Scanned | Maximum Number of Bits Y in Buffer |
| --- | --- |
| 0–5 | 20,000 bits |
| 5–10 | 17,000 bits |
| 10–15 | 15,000 bits |
| 15–25 | 13,000 bits |
| 25–35 | 11,500 bits |
| 35–45 | 10,000 bits |
| 45–55 | 8,500 bits |
| 55–65 | 7,500 bits |
| 65–75 | 6,500 bits |
| 75–85 | 6,000 bits |
| 85–95 | 5,500 bits |
| 95–100 | 5,000 bits |

Within each percentage X region of the document, the selective line-dropping algorithm is customized for that specific maximum buffer capacity Y to achieve smooth buffer-flushing. Hence, as the buffer capacity gradually decreases, for example, from 20,000 bits to 5,000 bits over the course of a document (page), the relative sizes of the safety zone and three critical zones increase, thereby increasing the probability of selective line-dropping and reducing the probability of buffer overflow. The process steps for smooth buffer-flushing and drastic line-dropping are as follows.

The percentage X region location of the document scan is determined at step 53 and provided for adjusting the three critical zone bases. If no percentage of the document page has previously been stored in the buffer 4 the process will proceed to step 59 and determine the new transmit pointer 22 and write pointer 21 positions. Alternatively, if a portion of the document page has been previously stored in the buffer 4, the process proceeds to step 54. As shown in step 54, within each of the percentage X of document scanned regions, drastic line-dropping is initiated if the number of bits between the write pointer 21 and transmit pointer 22 exceeds the maximum number of bits Y allowed to exist in the buffer 4 for that region. If the number of bits between the write pointer 21 and the transmit pointer 22 does not exceed the maximum number of bits Y allowed in the buffer 4 for that region, the process proceeds to process the next scan line in step 58. Drastic line-dropping as defined herein is analogous to selective line-dropping except all scan line bits written into the circular buffer are consecutively dropped until the bit difference between the write pointer 21 and transmit pointer 22 is less than the maximum buffer threshold as indicated at step 54.

For instance, assume that after the $k^{th}$ scan line has been processed, 88% of the document has been scanned and that the number of bits between the two pointers is 7,500 bits. Since the number of bits in the buffer 4, 7,500 bits, exceeds the current maximum buffer threshold of 5,500 bits in the 88% region, drastic line-dropping becomes necessary. Upon encoding the $(k+1)^{th}$ scan line, the transmit pointer 22 will advance normally at 3,200 bps, the write pointer 21 will be brought back to its previous position in the buffer at step 56, and the special 14-bit sequence consisting of an EOL, mode bit, and line-dropping bit having the line-dropping bit set to 1 at step 57, will be transmitted to the channel decoder. This process continues until the number of bits between the two pointers falls below 5,500 bits.

It is possible that in highly detailed documents with low compression gains, the result of many consecutive drastic line-droppings will be a region of high distortion consisting of a cluster of duplicated scan lines. This is an inevitable consequence for extremely detailed documents since the current scan line must be continually dropped and the previous scan line reconstructed in order to reduce the number of bits in the buffer to the required threshold. However, for approximately 90% of the documents tested, there were no occurrences of selective or drastic line-droppings. As a result, these algorithms displayed near transparent image quality.

Figure 8:
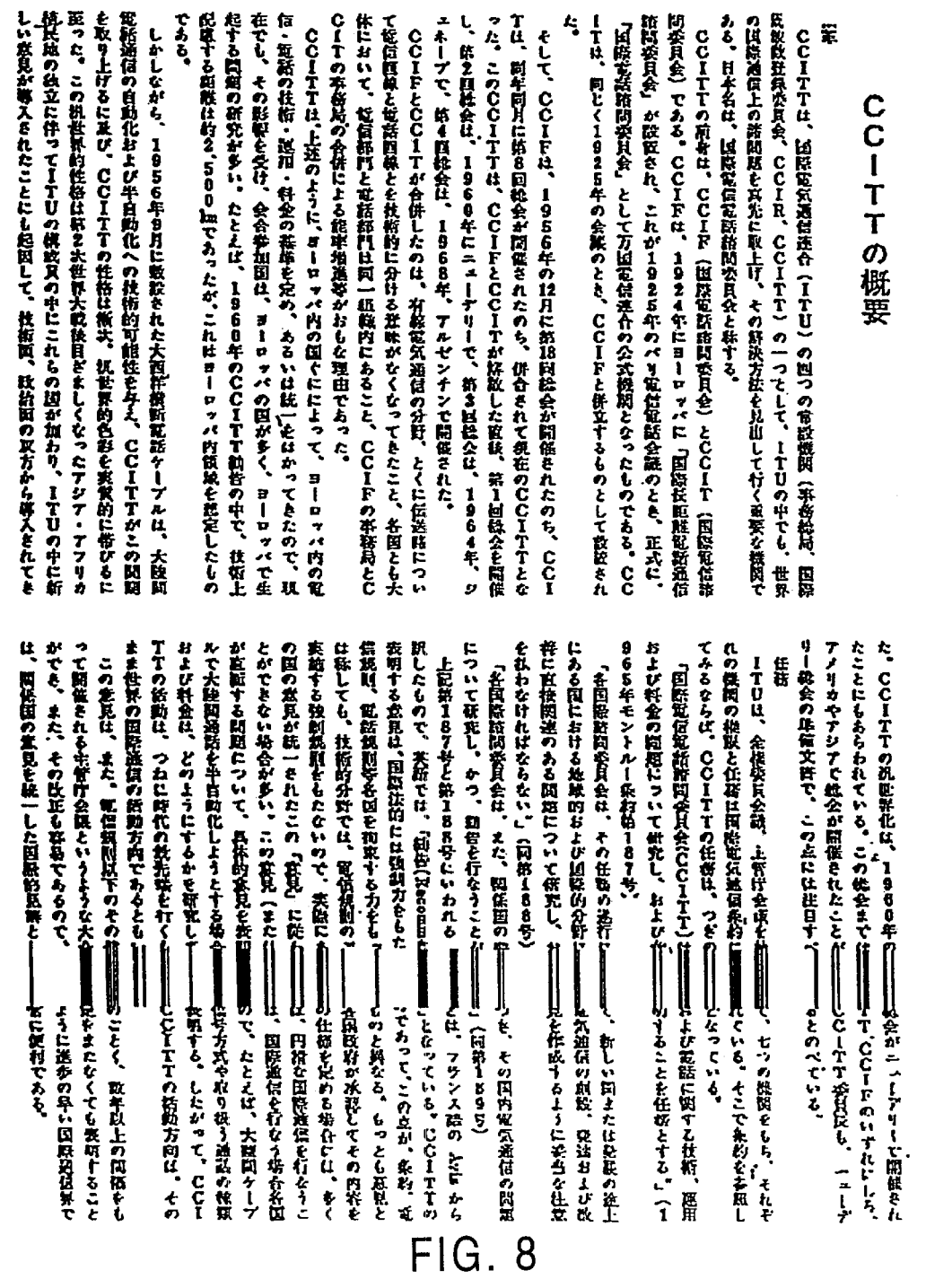

One of the major advantages of smooth buffer-flushing and drastic line-dropping is the gradual reduction of maximum buffer capacities over time as opposed to sharp decreases. As can be understood, employing a 20,000 bit buffer for the first 80% of a document and suddenly switching to a 5,000 bit buffer could generate tremendous distortion since many scan lines would need to be drastically dropped in order to reduce the buffer size from 20,000 bits to 5,000 bits at the 80% threshold. The result of such "rough buffer-flushing" is a centralized region of severe distortion. FIG. 8 illustrates CCITT test document 7 simulated with the rough buffer-flushing conditions described above. It can be seen at the 80% region that there exists a clearly visible section of high distortion due to many consecutive line-droppings.

Figure 9:
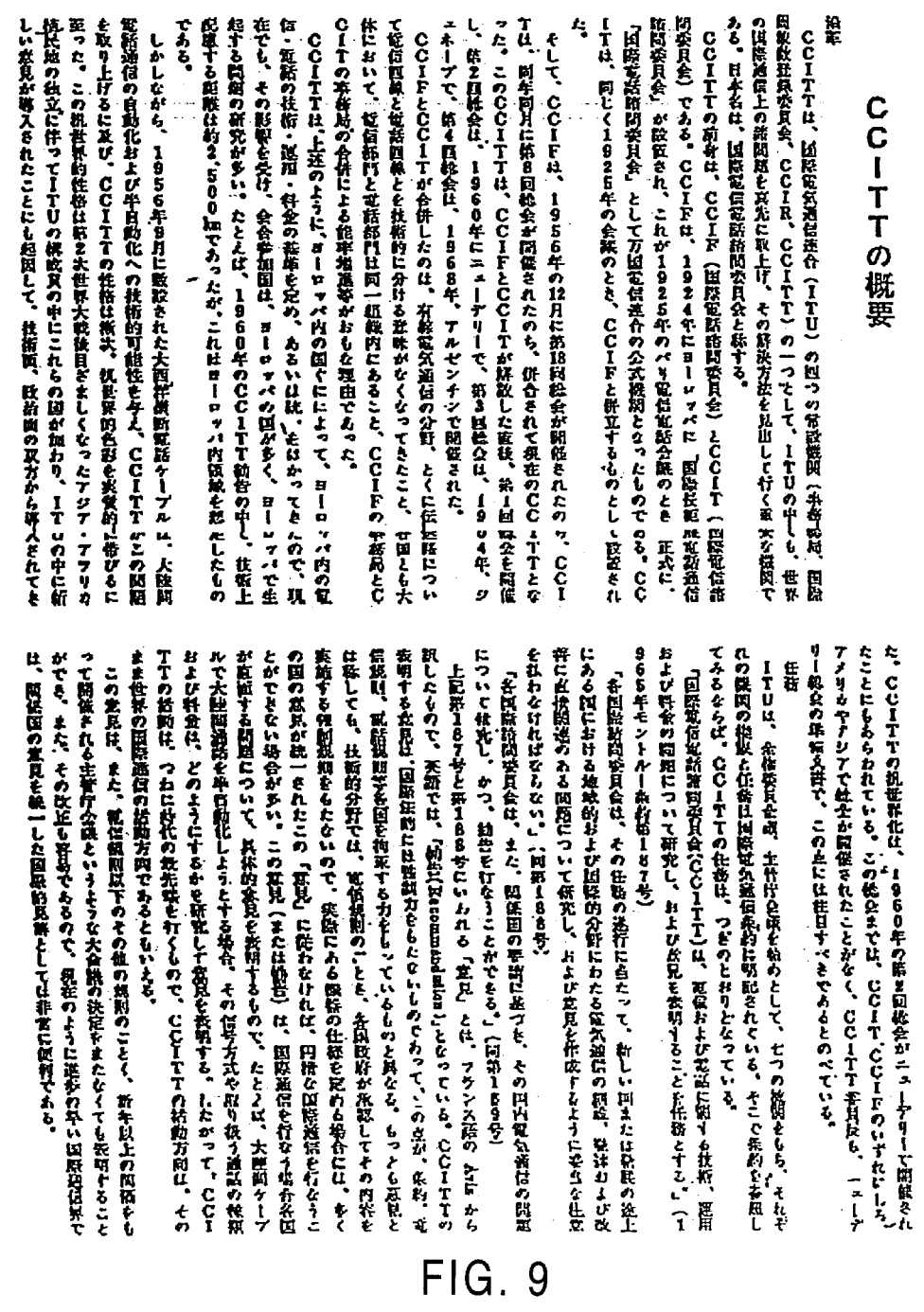

On the other hand, if CCITT test document 7 were processed with the smooth buffer-flushing algorithm of the present invention, there would be fewer drastic line-droppings since switching between adjacent buffers would involve fewer bits to be left untransmitted. As a result of gradually or smoothly flushing the buffer, fewer clustered line-droppings result, thereby giving the document an overall higher degree of attractiveness and legibility as illustrated by CCITT test document 7 simulated with the smooth buffer-flushing algorithm in FIG. 9. The resulting image is much more pleasing to the human eye since there does not exist one centralized region of severe distortion, but rather, all visible degradations have been successfully scattered throughout the entire document. Likewise, this process corrects the clipping problem (compare FIG. 3 with FIG. 7).

3. Sample Document Tests

Table 2 below displays the results of simulating the 8 CCITT test documents, and 3 other highly detailed documents through the buffer underflow and buffer overflow algorithms. Note that CCITT test documents 4 and 7 are of highest detail since their compression gains are the lowest.

ments as processed by the aforementioned buffer underflow control process and buffer overflow control process of the preferred embodiment. It can be clearly seen that the overall quality of the resulting images in FIGS. 10B, 11B, 12B, and 13B is very high. Although the simulated documents in these figures are not exact duplicates of the originals, they are highly legible relative to the facsimile documents transmitted by a standard G3 facsimile machine and significantly reduce the amount of total transmission time, hence cost, due to the ability to effectively use secondary image compression techniques. The occurrence of selective and drastic line-dropping will be inevitable for extremely detailed documents. However, the algorithms of the present invention are considered crucial and practical to control what might otherwise result in inefficient means of secondary image compression, transmission delays, transmission errors, bottom-of-page document clipping, and distortion, if no methods of buffer control are provided.

TABLE 2

| Document | Gain (including fill bits) | Maximum Buffer Size (w/o line-dropping) | Bits Left in Buffer at EOP | Bits Saved by Line-dropping | Number of Drastic Line-Droppings | Number of Total Line-Droppings |
|---|---|---|---|---|---|---|
| CCITT-1 | 1.50 | 1143 | 0 | 0 | 0 | 0 |
| CCITT-2 | 1.50 | 367 | 0 | 0 | 0 | 0 |
| CCITT-3 | 1.50 | 1019 | 0 | 0 | 0 | 0 |
| CCITT-4 (FIGS. 10A & 10B) | 1.41 | 22507 | 1729 | 17600 | 42 | 57 |
| CCITT-5 | 1.50 | 893 | 0 | 0 | 0 | 0 |
| CCITT-6 | 1.50 | 548 | 0 | 0 | 0 | 0 |
| CCITT-7 | 1.36 | 33351 | 2174 | 29674 | 40 | 90 |
| CCITT-8 | 1.50 | 400 | 0 | 0 | 0 | 0 |
| vbtypes (FIGS. 11A & 11B) | 1.42 | 20739 | 1791 | 15939 | 24 | 34 |
| txtt10 (FIGS. 12A & 12B) | 1.42 | 16948 | 857 | 11982 | 21 | 27 |
| patd (FIGS. 13A & 13B) | 1.44 | 8059 | 4290 | 3135 | 13 | 13 |

From the data in Table 2, it can be observed that for documents whose compression gains are high (i.e., 1.50), buffer overflow is not a problem, as the number of drastic line-droppings and total line-droppings is inconsequential. In such documents, buffer underflow is the major dilemma and the problem is prevented with the insertion of fill bits as previously described for the buffer underflow control process. However, as more detail is introduced to documents, thereby shrinking the amount of redundancy between scan lines and decreasing the overall compression gain, the number of dropped scan lines increases. Because highly detailed documents are packed with so much information per scan line, the number of bits in the buffer can grow arbitrarily large during the encoding and compression processes.

In an effort to reduce this difference to under 5,000 bits as to meet the 1.6 seconds EOP timing constraint, the physical evidence of drastic line-dropping can be observed in test documents CCITT 4, CCITT 7, vbtypes, txtt10, and patd, all of which experienced selective and drastic line-dropping and contain dispersed regions of extremely small distortion. FIGS. 10 through 13 illustrate these documents simulated with the buffer control processes of the preferred embodiment. Figures labeled with the A designation represent the original document as scanned into the facsimile machine and figures labeled with the B designation represent test docu- As can be appreciated by one skilled in the art, the invention is relevant to facsimile systems in general, and more specifically to a number of mobile communications networks, such as mobile satellite (Inmarsat-M, Inmarsat Mini-M) systems and digital cellular (North American Digital Cellular) systems.

While the invention has been described in conjunction with the preferred embodiment, it will be understood that it is not intended to limit the invention to this particular embodiment. To the contrary, the invention is intended to cover alternatives, modifications, and equivalents, which may be included within the spirit and scope of the invention as defined in the appended claims.

What is claimed is:

1. A method of controlling transmission in a facsimile system for transmitting data in the form of a plurality of lines of an image, each line of data ending with a known code, said method comprising the steps of:
    storing said data in a buffer prior to transmission; and
    restricting output of data from said buffer until at least two of said known code are present in said buffer.

2. A method according to claim 1, further comprising the step of stuffing a transmission channel with fill bits while output from said buffer is being prevented.

3. A method according to claim 2, wherein said output buffer is a circular buffer having a transmit pointer and a write pointer and the step of restricting output of data comprises restricting advancement of said transmit pointer while said write pointer advances to write a present facsimile data line into said circular buffer.

4. A method according to claim 2, wherein said fill bits have a predetermined data value.

5. A method of controlling transmission in a facsimile system for transmitting data in the form of a plurality of lines of an image, said system including a buffer for storing data to be transmitted, said data being written to said buffer at locations corresponding to a write pointer and read out of said buffer from locations corresponding to a transmit pointer, said method comprising the steps of:

defining a threshold corresponding to a degree of difference between a current line and a previous line;

changing said threshold during transmission of a given image;

comparing said current and previous lines; and dropping said current line in accordance with the results of said comparing step.

6. A method according to claim 5, wherein said dropping step comprises dropping said current line if said threshold is not exceeded.

7. A method according to claim 5, wherein said defining step comprises defining a plurality of zones each corresponding to a respective range of distances between said write pointer and transmit pointer, and defining a different threshold for each said zone.

8. A method of controlling transmission in a facsimile system for transmitting data in the form of a plurality of lines of an image, said system including a buffer for storing data to be transmitted, said data being written to said buffer at locations corresponding to a write pointer and read out of said buffer from locations corresponding to a transmit pointer, said method comprising the steps of:

defining a plurality of zones each corresponding to a respective range of distances between said write pointer and transmit pointer;

defining for each zone a respective threshold corresponding to a degree of difference between a current line and a previous line;

comparing said current and previous lines; and dropping said current line in accordance with the results of said comparing step and in accordance with the distance between said write and transmit pointers.

9. A method according to claim 8, further comprising the step of changing the size of at least one of said zones as a function of the amount of image transmitted.

10. A method according to claim 8, further comprising the step of transmitting a line drop indicator each time that a line is dropped.

11. A method according to claim 8, wherein each page of facsimile image ends with an end of page marker, said method further comprising the step of terminating further transmission of an image after an end of page marker is detected if a threshold is exceeded which corresponds to a closest range of distances between said write and transmit pointers.

12. A method according to claim 8, wherein said plurality of zones comprises four zones.

13. A method of controlling transmission in a facsimile system for transmitting data in the form of a plurality of lines of an image, said system including a buffer for storing data to be transmitted, said data being written to said buffer at locations corresponding to a write pointer and read out of said buffer from locations corresponding to a transmit pointer, said method comprising the steps of:

defining a maximum permitted amount of data in said buffer;

adjusting said maximum in accordance with an amount of image transmitted; and dropping a line of said image if said maximum is exceeded.

14. A method according to claim 13, wherein said defining step comprises defining a plurality of zones each corresponding to a respective percentage completion of said image, and defining a different maximum for each said zone.

15. A method according to claim 14, wherein a zone corresponding to a largest amount of completion of said image has the lowest maximum.

16. A facsimile system for transmitting data in the form of a plurality of lines of an image, each line of data ending with a known code, comprising:

a buffer for storing said data prior to transmission; and a transmission control mechanism restricting output of data from said buffer until at least two of said known codes are present in said buffer.

17. A system according to claim 16, further comprising a stuffing mechanism for stuffing a transmission channel with fill bits while output from said buffer is being prevented.

18. A system according to claim 17, wherein said output buffer is a circular buffer having a transmit pointer and a write pointer and said transmission control mechanism restricts output of data by restricting advancement of said transmit pointer while said write pointer advances to write a present facsimile data line into said circular buffer.

19. A facsimile system for transmitting data in the form of a plurality of lines of an image, said system including a buffer for storing data to be transmitted, said data being written to said buffer at locations corresponding to a write pointer and read out of said buffer from locations corresponding to a transmit pointer, said system further comprising:

means for defining a threshold corresponding to a degree of difference between a current line and a previous line;

means for changing said threshold during transmission of a given image;

means for comparing said current and previous lines; and means for dropping said current line in accordance with the results of said comparing step.

20. A system according to claim 19, wherein said means for defining defines a plurality of zones each corresponding to a respective range of distances between said write pointer and transmit pointer, and said thresholds being different for each said zone.

21. A system according to claim 19, wherein said means for dropping drops said current line if said threshold is not exceeded.

22. A system according to claim 19, wherein said means for changing changes said threshold as a function of the amount of said image transmitted.

23. A facsimile system for transmitting data in the form of a plurality of lines of an image, said system including a buffer for storing data to be transmitted, said data being written to said buffer at locations corresponding to a write pointer and read out of said buffer from locations corresponding to a transmit pointer, said system further comprising a transmit control mechanism which compares said current and previous lines and drops said current line in accordance with the results of said comparison and in accordance with a distance between said write and transmit pointers.

24. A system according to claim 23, wherein said transmit control mechanism defines a plurality of zones each corresponding to a respective range of distances between said write pointer and transmit pointer, with each zone having a respective threshold corresponding to a degree of difference between a current line and a previous line, said threshold mechanism dropping a line if said threshold is not exceeded in any zone.

25. A system according to claim 23, further comprising means for transmitting a line drop indicator each time that a line is dropped.

26. A system according to claim 23, wherein each page of facsimile image ends with an end of page marker, said transmit control mechanism terminating further transmission of an image after an end of page marker is detected if a threshold is exceeded which corresponds to a closest range of distances between said write and transmit pointers.

* * * * *